(12) United States Patent  
Finlayson et al.

(10) Patent No.: US 11,809,556 B2  
(45) Date of Patent: **\*Nov. 7, 2023**

(54) SYSTEM AND METHOD FOR DETECTING A MALICIOUS FILE

(71) Applicant: Endgame Systems, Inc., Arlington, VA (US)

(72) Inventors: William Finlayson, Philadelphia, PA (US); Hyrum Anderson, Eagle, ID (US)

(73) Assignee: Endgame Systems, Inc., Arlington, VA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/412,123

(22) Filed: Aug. 25, 2021

(65) Prior Publication Data

US 2021/0382993 A1    Dec. 9, 2021

Related U.S. Application Data

(63) Continuation of application No. 15/976,539, filed on May 10, 2018, now Pat. No. 11,275,833.

(51) Int. Cl.
    *G06F 21/56*       (2013.01)
    *G06N 3/04*        (2023.01)
    *G06V 30/40*      (2022.01)

(52) U.S. Cl.
    CPC .......... *G06F 21/561* (2013.01); *G06F 21/562* (2013.01); *G06N 3/04* (2013.01); *G06V 30/40* (2022.01)

(58) Field of Classification Search
    CPC ........ G06F 21/562; G06F 21/561; G06N 3/04

(Continued)

(56) References Cited

U.S. PATENT DOCUMENTS 8,943,546 B1    1/2015    Khetawat
9,104,867 B1    8/2015    Thioux et al.
(Continued)

FOREIGN PATENT DOCUMENTS

EP             3652647 A1     5/2020
WO    WO-2018048355 A1 *   3/2018        G06F 16/783
WO    WO2019217462 A1    11/2019

OTHER PUBLICATIONS

"International Search Report" and "Written Opinion of the International Searching Authority," Patent Cooperation Treaty Application No. PCT/US2019/031177, dated Dec. 7, 2018, 6 pages.

(Continued)

*Primary Examiner* — Bryan F Wright
(74) *Attorney, Agent, or Firm* — Quinn IP Law (57) ABSTRACT

A system and a method for analyzing files using visual cues in the presentation of the file is provided. These visual aids may be extracted using a convolutional neural network, classified, and used in conjunction with file metadata to determine if a provided document is likely to be malicious. This methodology may be extended to detect a variety of social engineering-related attacks including phishing sites or malicious emails. A method for analyzing a received file to determine if the received file comprises malicious code begins with generating an image that would be displayed if the received file is opened by the native software program. Then the image is analyzed, and output is generated. Metadata is also extracted from the received file. Then, a maliciousness score is generated based on the output, the metadata, and a reference dataset.

20 Claims, 13 Drawing Sheets

(58) Field of Classification Search
USPC .......................................................... 726/24
See application file for complete search history.

(56) References Cited

U.S. PATENT DOCUMENTS

| | | | | |
|---|---|---|---|---|
| 9,241,010 | B1* | 1/2016 | Bennett | ............... H04L 63/1416 |
| 10,282,431 | B1* | 5/2019 | Bhotika | .............. G06F 16/5838 |
| 10,601,866 | B2 | 3/2020 | Bartik et al. | |
| 11,275,833 | B2 | 3/2022 | Finlayson et al. | |
| 2010/0138775 | A1* | 6/2010 | Kohen | ................ G06F 11/3041 |
| | | | | 715/781 |
| 2012/0023566 | A1* | 1/2012 | Waterson | ................ G06F 21/56 |
| | | | | 726/9 |
| 2012/0311697 | A1 | 12/2012 | Swingler et al. | |
| 2013/0097706 | A1 | 4/2013 | Titonis et al. | |
| 2015/0096022 | A1 | 4/2015 | Vincent et al. | |
| 2015/0135264 | A1 | 5/2015 | Amiga | |
| 2016/0088015 | A1* | 3/2016 | Sivan | ....................... H04L 9/40 |
| | | | | 726/23 |
| 2018/0046799 | A1 | 2/2018 | Kohavi et al. | |
| 2018/0183815 | A1* | 6/2018 | Enfinger | ............... H04L 63/145 |
| 2018/0276495 | A1 | 9/2018 | Yu et al. | |
| 2019/0104154 | A1 | 4/2019 | Kumar et al. | |
| 2019/0347412 | A1 | 11/2019 | Finlayson et al. | |

OTHER PUBLICATIONS

Zhou et al., "Visual Similarity Based Anti-phishing with the Combination of Local and Global Features", 2014 IEEE 13th International Conference on Trust, Security and Privacy in Computing and Communications, IEEE, Sep. 24, 2014, pp. 189-196.
Cheng et al., "An Information-Sharing Based Anti-Phishing System", Data, Privacy, and E-Commerce, 2007 . ISDPE 2007. The First International Symposium on, IEEE, Nov. 1, 2007, pp. 265-270.
"Extended European Search Report", European Patent Application No. 19800620.7, dated Mar. 4, 2021, 10 pages.

* cited by examiner

SYSTEM AND METHOD FOR DETECTING A MALICIOUS FILE

CROSS REFERENCE TO RELATED APPLICATIONS

This patent application is a continuation of, and claims priority benefit of, U.S. patent application Ser. No. 15/976,539, filed May 10, 2018, entitled "System and Method for Detecting Malware Using Image Analysis Prior to Execution of the file," which is hereby incorporated by reference herein in its entirety.

FIELD OF THE INVENTION

The present invention utilizes image processing techniques to identify a malicious file before a user is able to inadvertently cause malicious code to be executed through the user's interactions with the file.

BACKGROUND OF THE INVENTION

Figure 1:
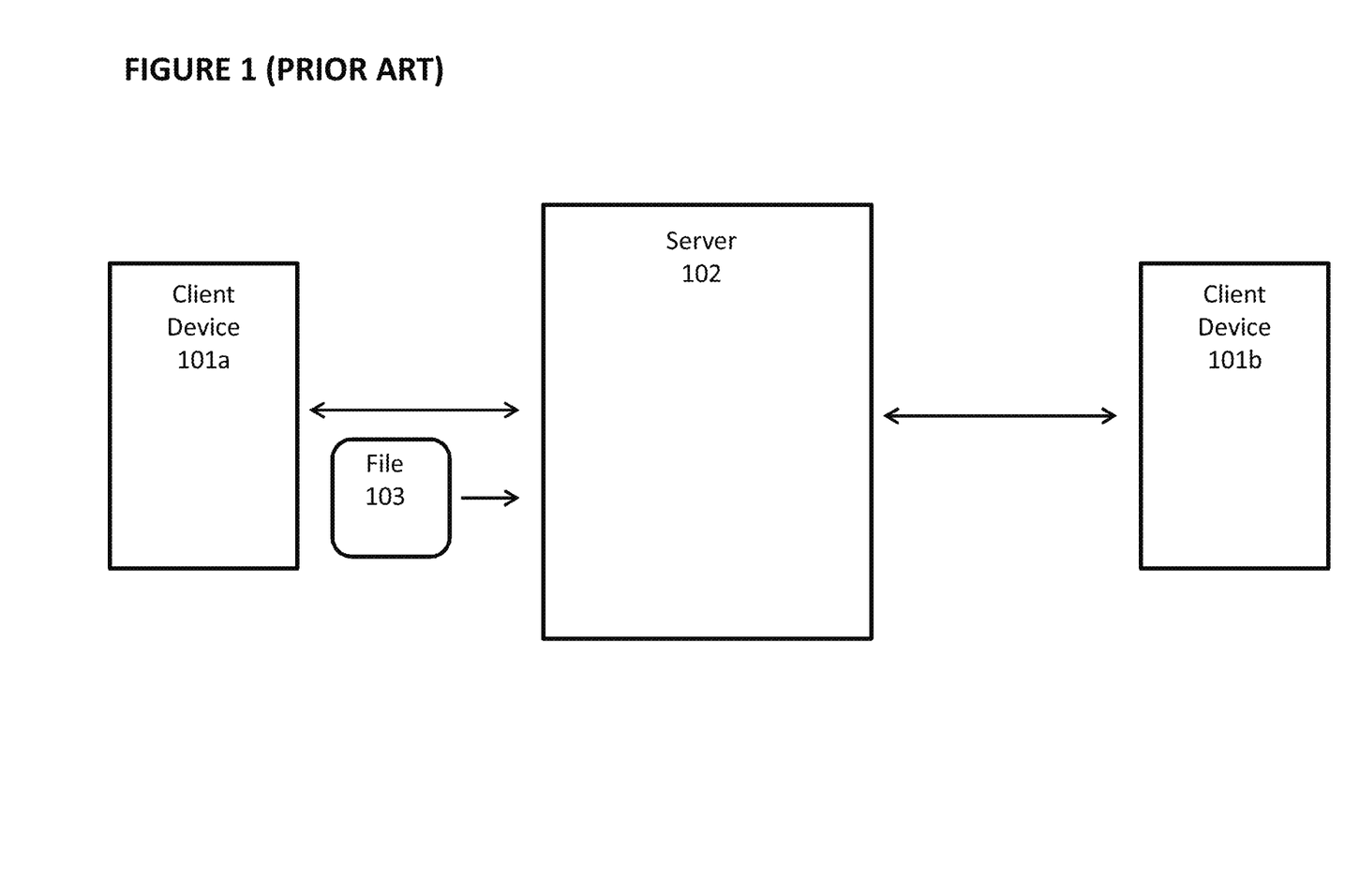
FIG. 1 depicts a prior art system where a file is transmitted from a client device to a server.

Cyber attackers utilize increasingly creative attacks to infiltrate computers and networks. With reference to FIG. 1, a common cyber attack mechanism is to send file 103 from client device 101a operated by a cyber attacker to an unsuspecting user. For example, the cyber attacker might send an email attaching file 103 to server 102, which in this example is an email server that the user can access from exemplary client device 101b. The cyber attacker also might upload file 103 to server 102 and send a message to the user to access file 103.

Figure 2:
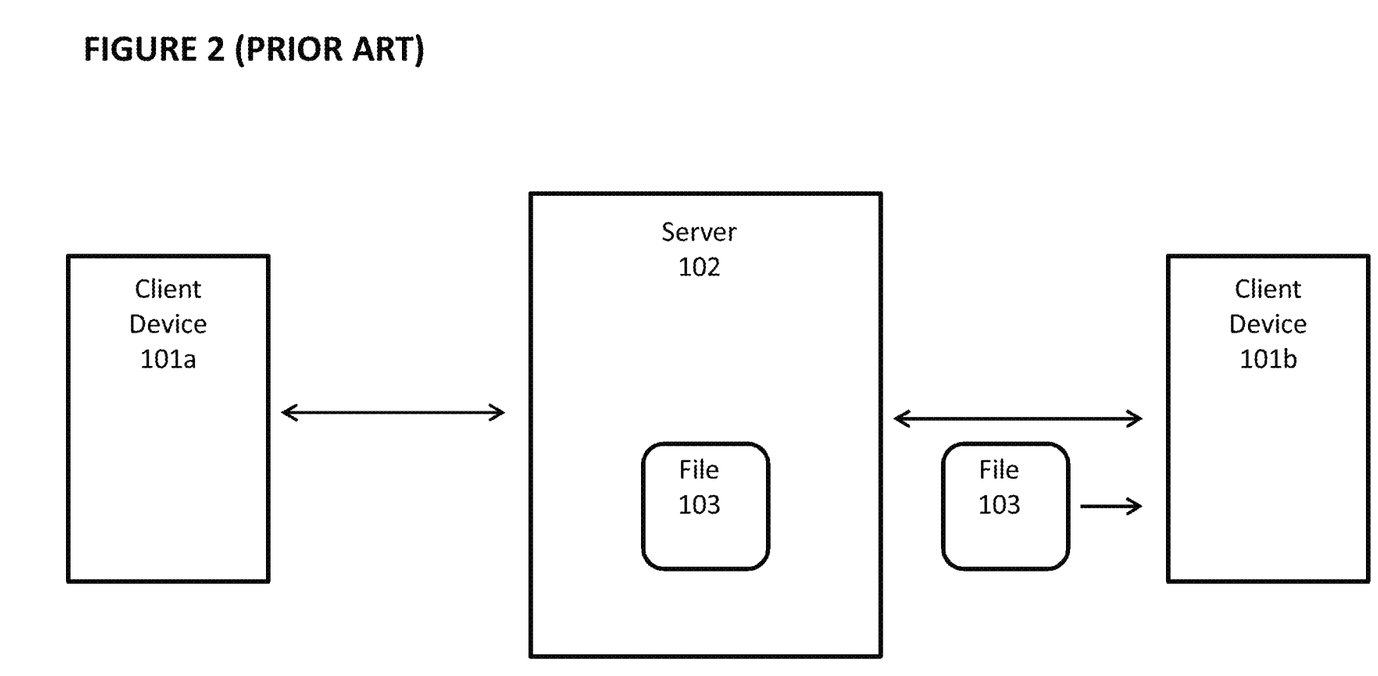
FIG. 2 depicts the prior art system of FIG. 1 where the file is received by the server and accessed by another client device.

With reference to FIG. 2, when the user opens file 103 and views it, the viewed image visually resembles a legitimate file. For example, the viewed image may look like an invoice from a valid e-commerce website or a statement from a valid credit card company.

Figure 3:
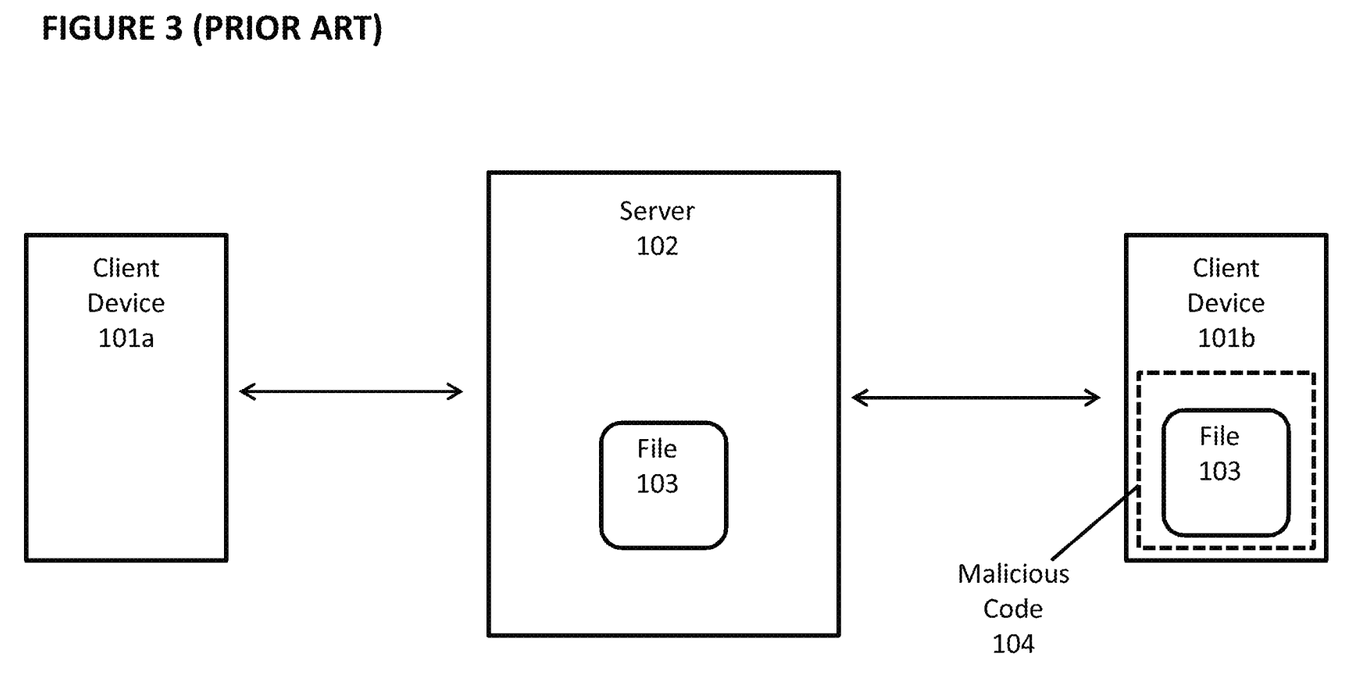
FIG. 3 depicts the prior art system of FIGS. 1 and 2 where client device 101b interacts with file 103 and causes malicious code 104 to be executed.

With reference to FIG. 3, believing the file to be legitimate, the user might interact with the file, such as by clicking on a link within the file. This action will then cause malicious code 104 to be executed. For example, it is a common technique for a malicious file to contain a visual cue to convince the user to enable the Visual Basic for Applications (VBA) module in the software suite known by the trademark "Microsoft Office," which then causes the malicious code to execute. Malicious code 104 can then attack client device 101b and potentially any network or device connected to client device 101b. Malicious code 104 typically will erase or corrupt stored data within a computing device or gather and transmit data from a computing device to another device operated by the cyber attacker.

Prior art malware prevention software typically will compare file 103 to known malicious files and will prevent the opening of file 103 if a match is found. For example, a static pattern matching process might be used to compare the embedded malicious code 104 within file 103 to known malicious code (e.g., using signatures) or to compare the dynamic behaviors of malicious code 104 to those of known malicious code (e.g., API hooking). As such, the prior art requires that a set of rules be collected and maintained that either match the potential malicious code against known bad samples or to inspect function parameters during API calls. These prior art mechanisms are ineffective if file 103 is new and different from known malicious files. Moreover, these prior art mechanisms do not take advantage of the fact that the cyber attacker intentionally designs file 103 to visually mimic legitimate files.

What is needed is an improved system and method that accurately identifies malicious files by analyzing visual characteristics of the file before a user interacts with the file or otherwise causes malicious code to be executed.

BRIEF SUMMARY OF THE INVENTION

The embodiments comprise a system and method for analyzing files using visual cues in the presentation of the file. These visual aids may be extracted using a convolutional neural network, classified, and used in conjunction with file metadata to determine if a provided document is likely to be malicious. This methodology may be extended to detect a variety of social engineering-related attacks including phishing sites or malicious emails.

DETAILED DESCRIPTION OF THE INVENTION

Figure 4:
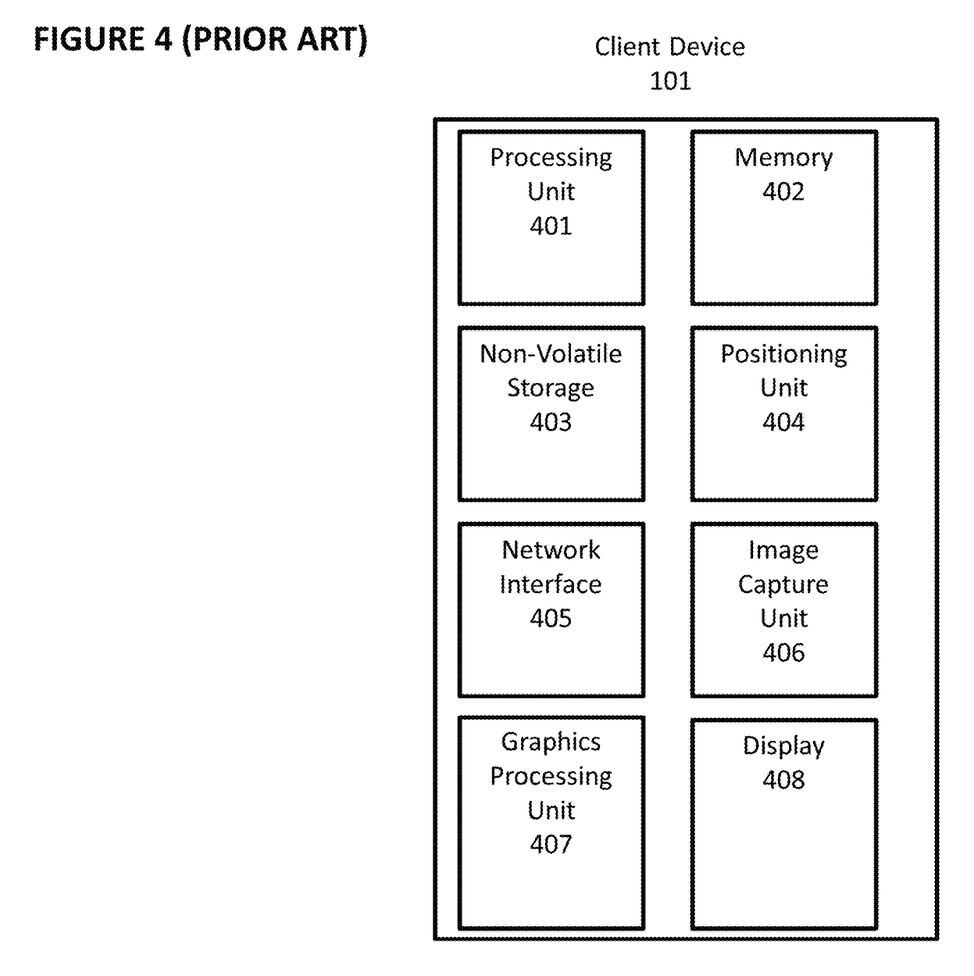
FIG. 4 depicts prior art hardware components of a client device.

FIG. 4 depicts hardware components of client device 101. These hardware components are known in the prior art. Client device 101 is a computing device that comprises processing unit 401, memory 402, non-volatile storage 403, positioning unit 404, network interface 405, image capture unit 406, graphics processing unit 407, and display 408. Client device 101 can be a smartphone, notebook computer, tablet, desktop computer, gaming unit, wearable computing device such as a watch or glasses, or any other computing device.

Processing unit 401 optionally comprises a microprocessor with one or more processing cores. Memory 402 optionally comprises DRAM or SRAM volatile memory. Non-volatile storage 403 optionally comprises a hard disk drive or flash memory array. Positioning unit 404 optionally comprises a GPS unit or GNSS unit that communicates with GPS or GNSS satellites to determine latitude and longitude coordinates for client device 101, usually output as latitude data and longitude data. Network interface 405 optionally comprises a wired interface (e.g., Ethernet interface) or wireless interface (e.g., 3G, 4G, GSM, 802.11, protocol known by the trademark "Bluetooth," etc.). Image capture unit 406 optionally comprises one or more standard cameras (as is currently found on most smartphones and notebook computers). Graphics processing unit 407 optionally comprises a controller or processor for generating graphics for display. Display 408 displays the graphics generated by graphics processing unit 407, and optionally comprises a monitor, touchscreen, or other type of display.

Figure 5:
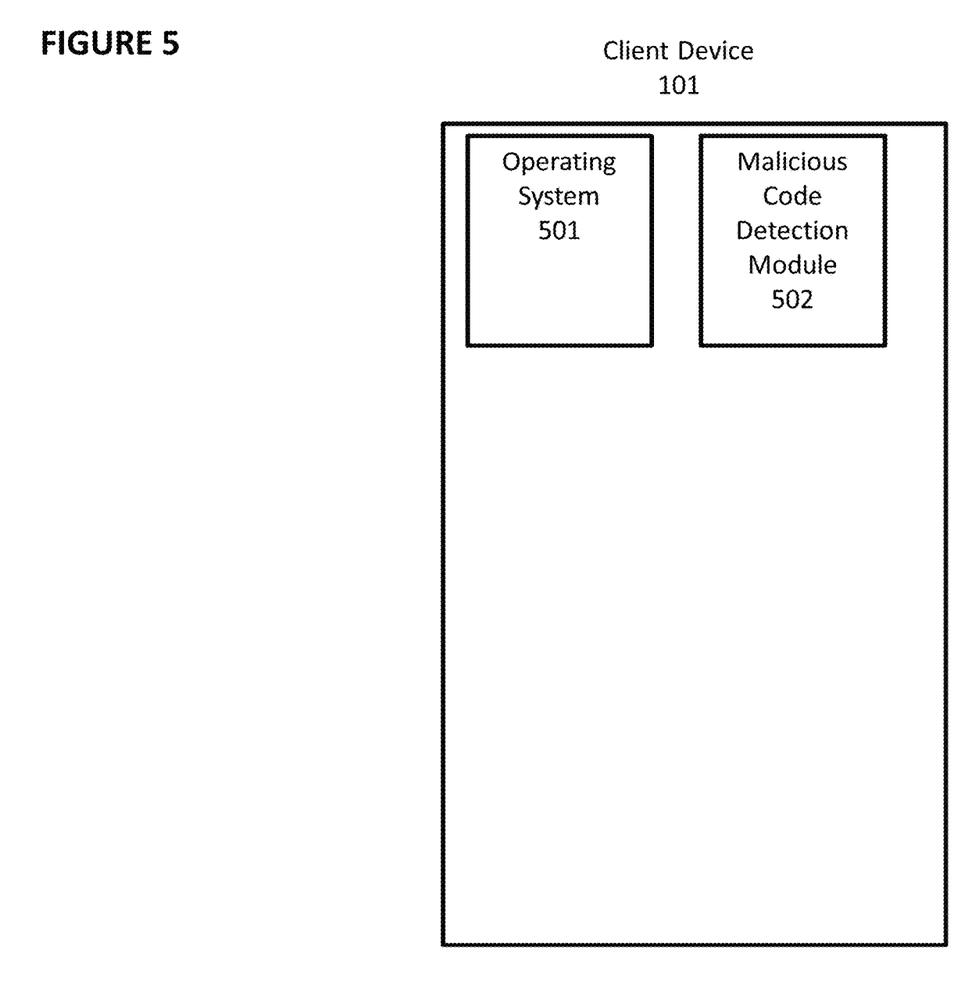
FIG. 5 depicts software components of the client device.

FIG. 5 depicts software components of client device 101. Client device 101 comprises operating system 501 (such as the operating systems known by the trademarks "Windows," "Linux," "Android," "iOS," or others) and malicious code detection module 502. Malicious code detection module 502 comprises lines of software code executed by processing unit 401 to perform the functions described below.

For example, client device 101 can be a smartphone sold with the trademark "Galaxy" by Samsung or "iPhone" by Apple, and malicious code detection module 502 can be a downloadable app installed on the smartphone. Client device 101 also can be a notebook computer, desktop computer, game system, or other computing device, and malicious code detection module 502 can be a software application running on client device 101. Malicious code detection module 502 forms an important component of the inventive aspect of the embodiments described herein, and malicious code detection module 502 is not known in the prior art.

Figure 6:
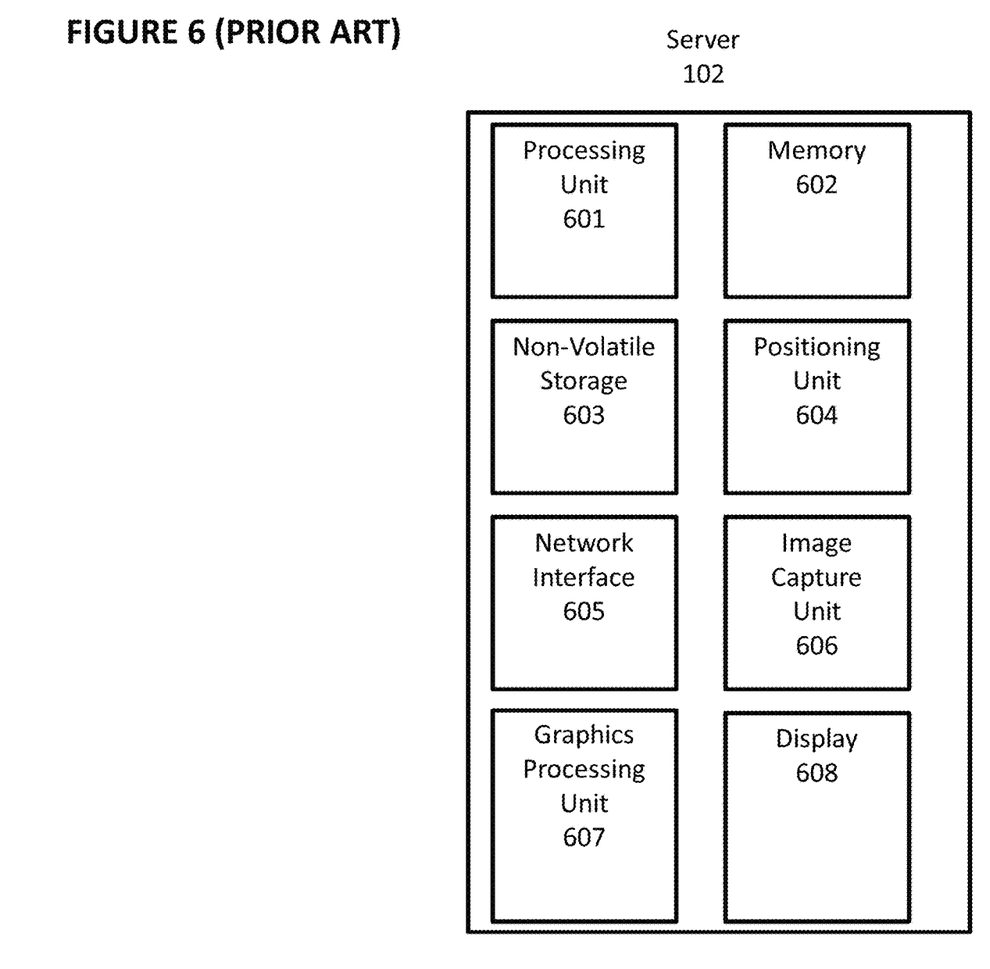
FIG. 6 depicts prior art hardware components of a server.

FIG. 6 depicts hardware components of server 102. These hardware components are known in the prior art and are similar or identical to the hardware components of client device 101. Server 102 is a computing device that comprises processing unit 601, memory 602, non-volatile storage 603, positioning unit 604, network interface 605, image capture unit 606, graphics processing unit 607, and display 608.

Figure 7:
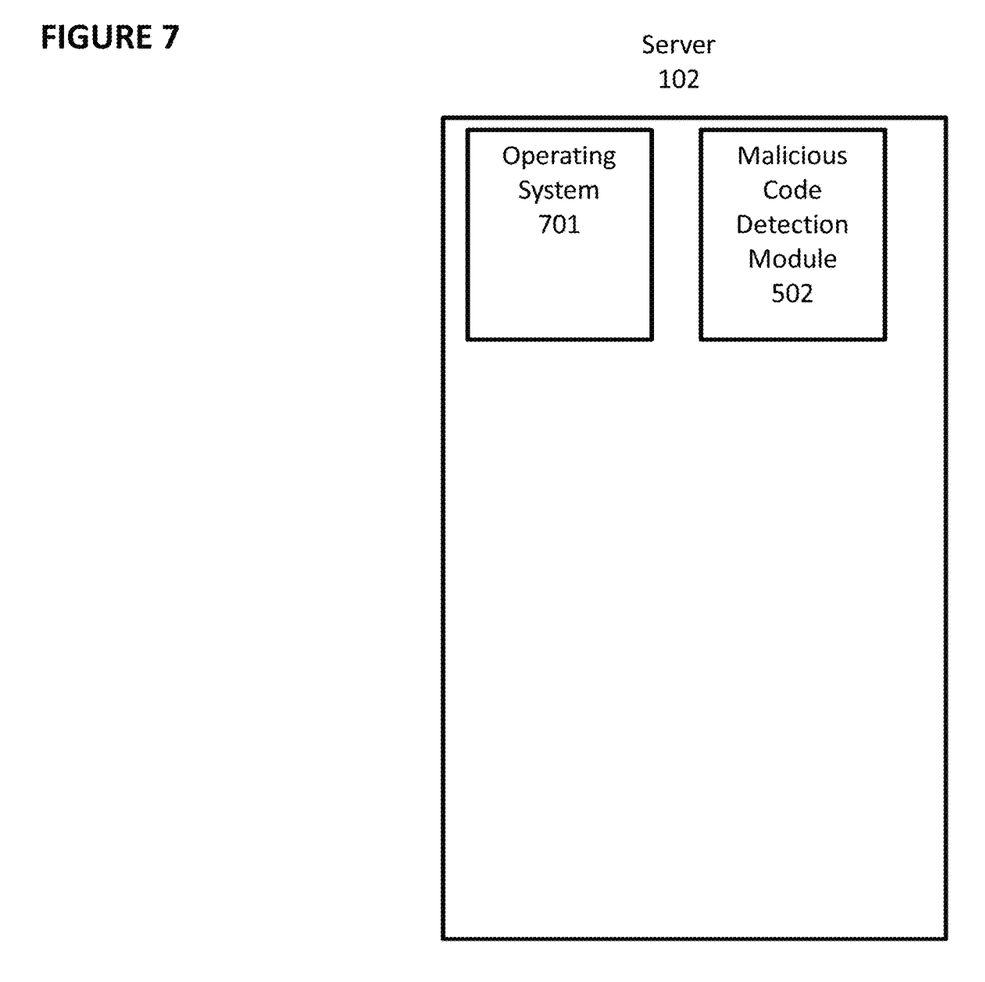
FIG. 7 depicts software components of the server.

FIG. 7 depicts software components of server 102. Server 102 comprises operating system 701 (such as the operating systems known by the trademarks "Windows," "Linux," "Android," "iOS," or others) and malicious code detection module 502. Thus, malicious code detection module 502 can operate on server 102, client device 101, or both.

As described in greater detail below, malicious code detection module 502 decouples the visual presentation of file 103 from the underlying malicious code 104. This allows the visual presentation of file 103 to be analyzed separately, before malicious code 104 is executed and before a user even has the opportunity to inadvertently cause malicious code 104 to be executed.

Figure 8:
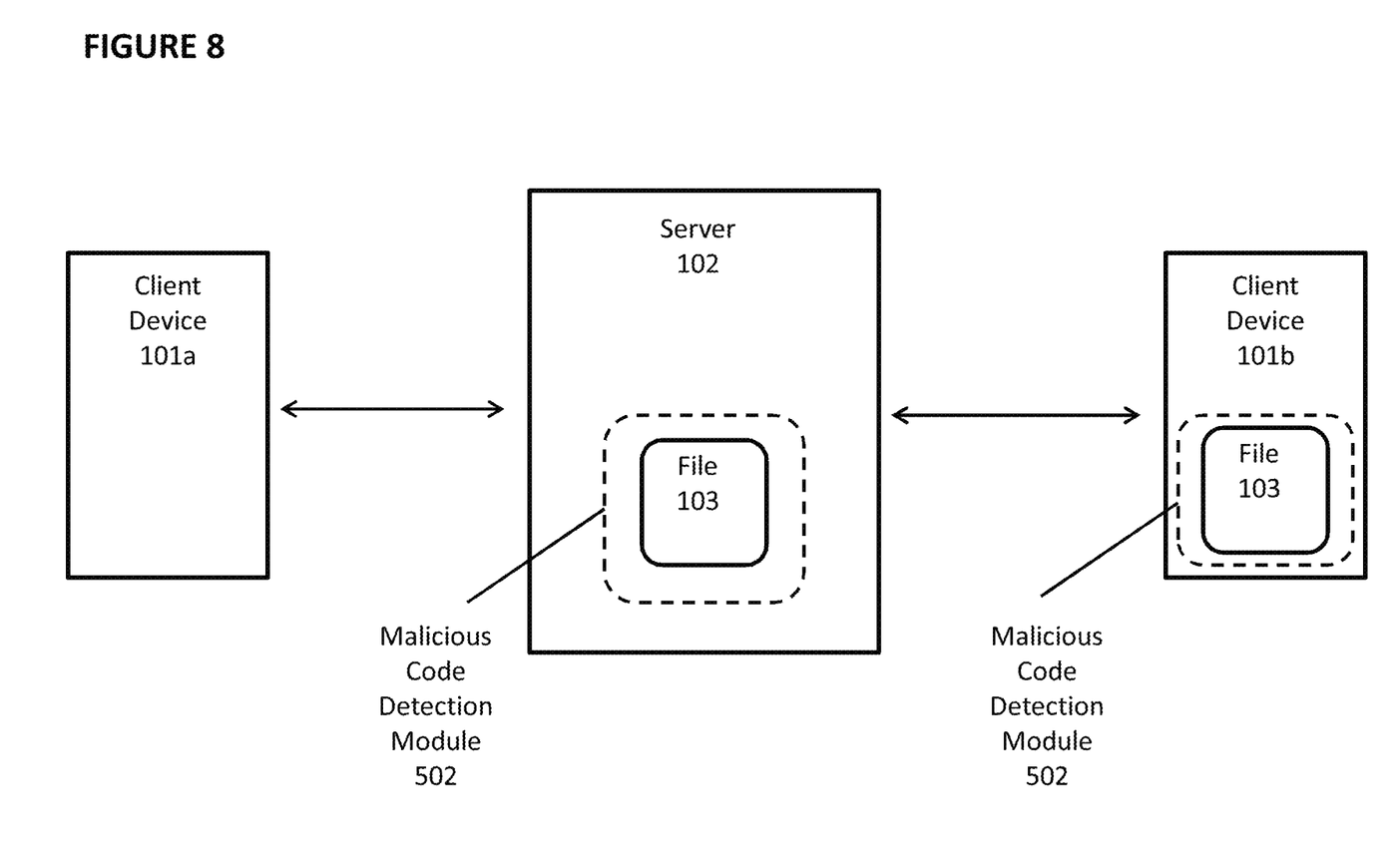
FIG. 8 depicts a malicious code detection module executed by a server and client device.

With reference to FIG. 8, client device 101a sends file 103 to server 102 and/or client device 101b as in FIGS. 1-2. However, malicious code detection module 502 (whether operating on server 102, client device 101b, or both) immediately acts upon file 103.

Figure 9:
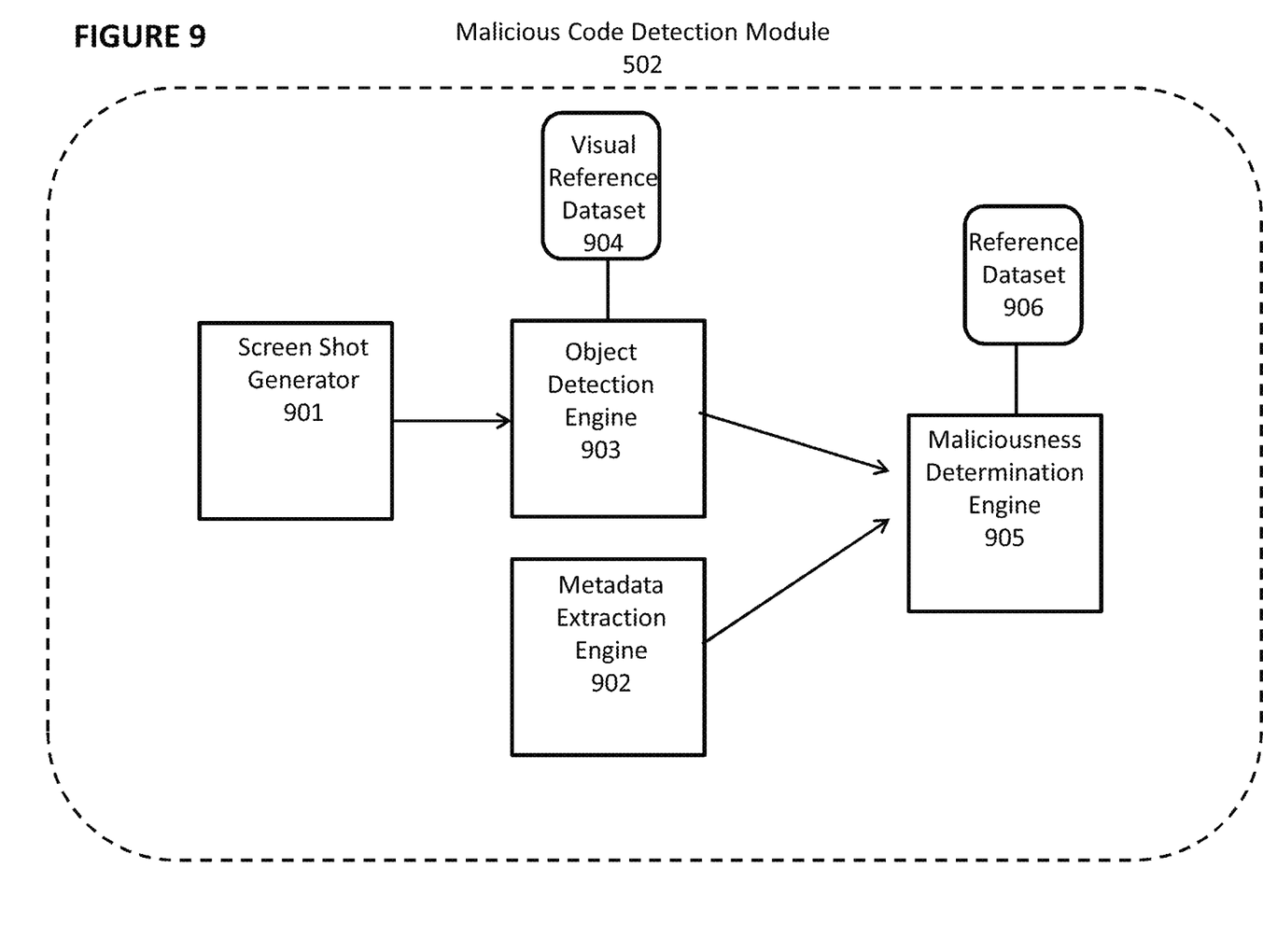
FIG. 9 depicts components of the malicious code detection module.

With reference to FIG. 9, malicious code detection module 502 comprises screen shot generator engine 901, metadata extraction engine 902, object detection engine 903, and maliciousness determination engine 905. Screen shot generator engine 901, metadata extraction engine 902, object detection engine 903, and maliciousness determination engine 905 each comprises lines of software code executed by processing unit 401.

Figure 10:
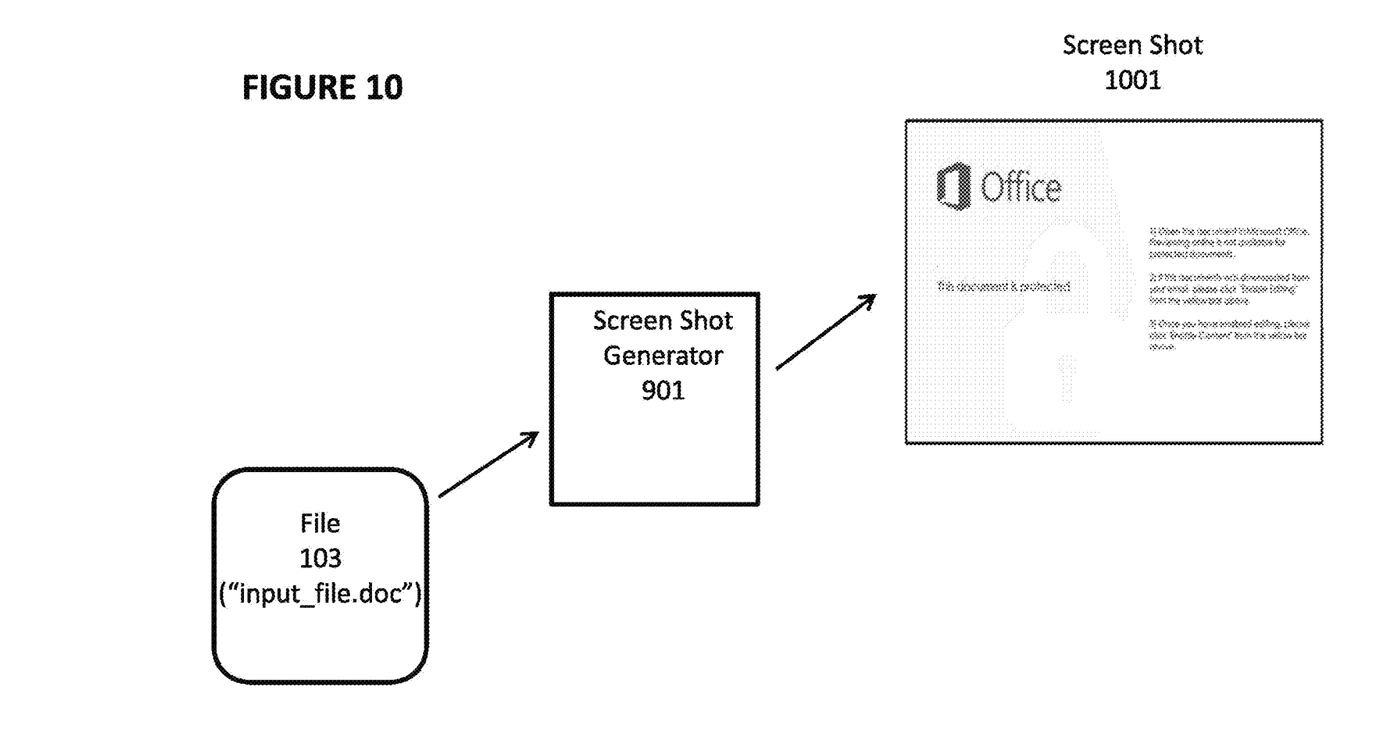
FIG. 10 depicts a screen shot generator of the malicious code detection module.
Figure 11:
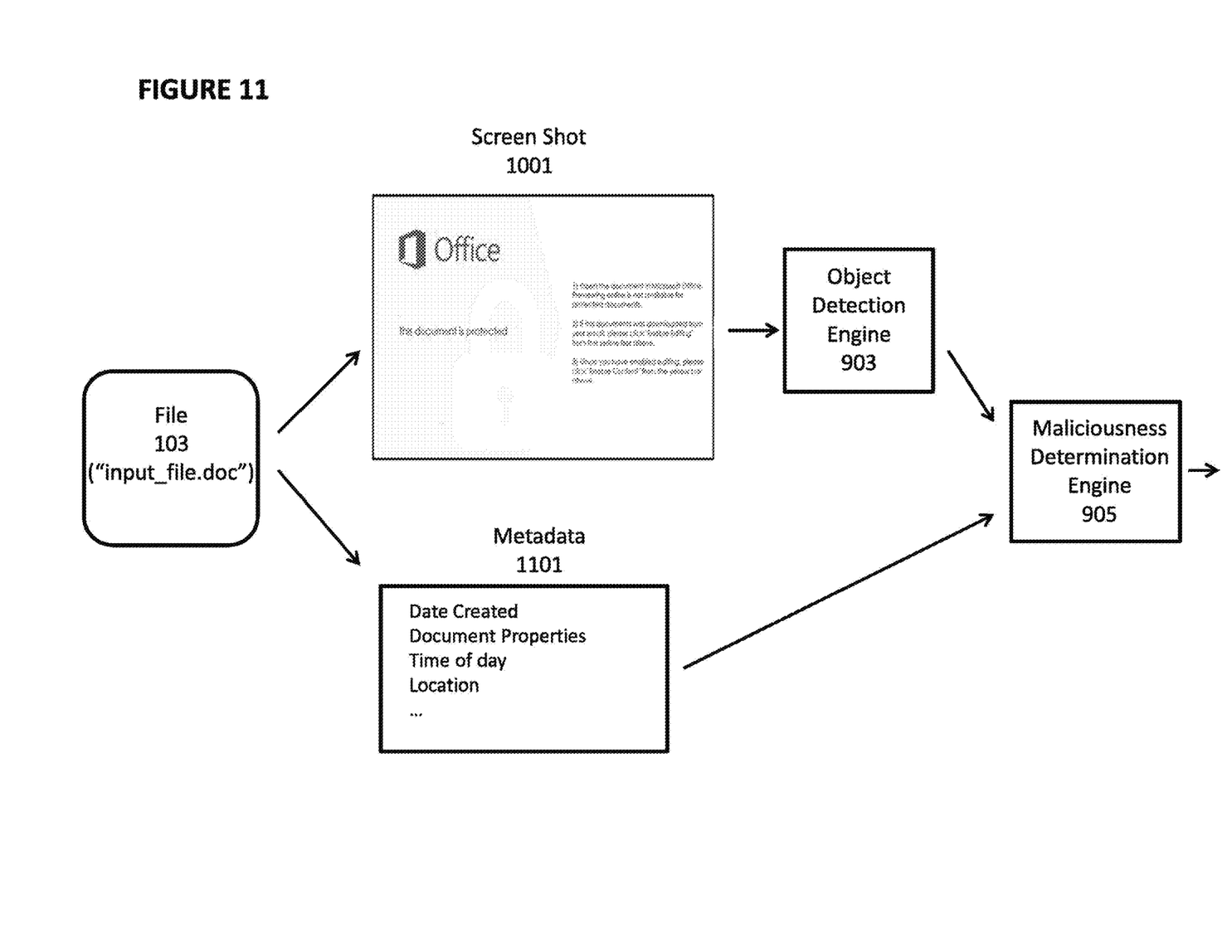
FIG. 11 depicts feature generation of the malicious code detection module.
Figure 12:
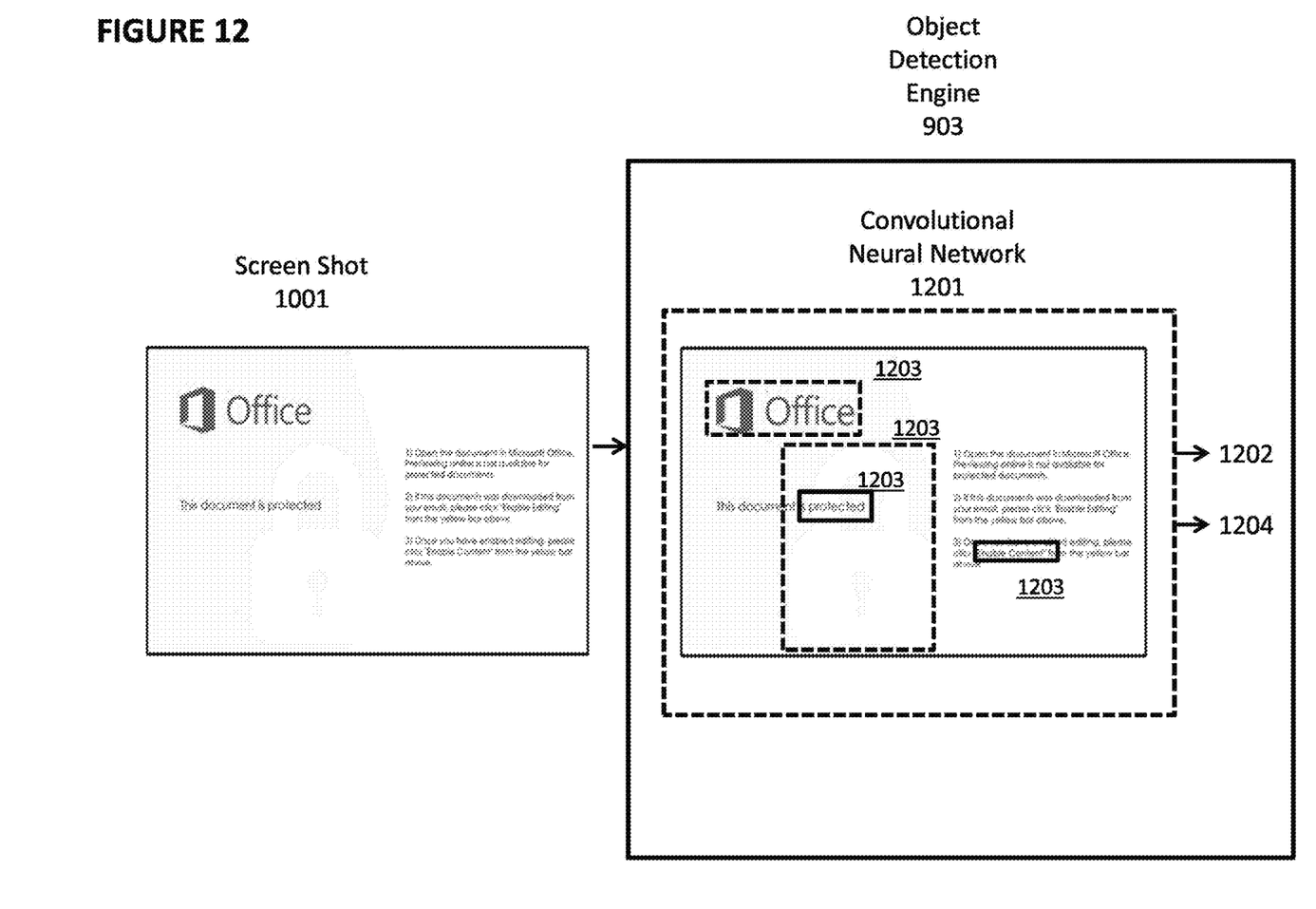
FIG. 12 depicts the object detection of the malicious code detection module.

With reference to FIGS. 10-12, screen shot generator engine 901, metadata extraction engine 902, and object detection engine 903 are used to analyze known good and bad files to generate visual reference dataset 904 during a training phase.

With reference to FIG. 10, screen shot generator engine 901 performs a "print preview" operation on file 103, which generates screen shot 1001, which is an image of what would appear on the screen when file 103 is opened with its native software. In this example, file 103 is a file with file name "input_file.doc" created using a word processing program known by the trademark Microsoft Word. However, screen shot generator engine 901 performs only the limited function of generating the screen image and does not execute any of the additional functionality that would be available in the native software. In this example, screen shot 1001 is an image of what a user would see on display 408 or 608 when file 103 is opened by Microsoft Word, but the functions of that software (such as the ability to edit a document or click on a hyperlink) would not be available in the screenshot.

Screen shot generator engine 901 optionally utilizes API hooking, which indicates to screen shot generator engine 901 when file 103 has finished loading. A screenshot is then taken, cropped, and provided for classification along with the label of malicious/benign.

The next step in the training phase involves the evaluation of sample file 103 and its classification of malicious vs benign. This involves quantifying numeric features from the file metadata 1101 for file 103 and screen shot 1001 for classification for each sample. With reference to FIG. 11, each file, such as file 103, has metadata 1101 extracted from it (e.g., date created, various document properties), contextualized data about the user is captured (e.g., time of day the file is being opened, location of the user), and screen shot image 1001 is transformed for use with the object detection engine 903. Metadata 1101 is then forwarded to maliciousness determination engine 905 and the screenshot, such as screen shot 1001, is input into object detection engine 903.

With reference to FIG. 12, object detection engine 903 receives as an input screen shot 1001, which typically comprises an array of pixel data. This data is provided as an input to a convolutional neural network 1201 within object detection engine 903. Convolutional neural network 1201 generates a set of object boundaries with associated probabilities 1202. For example, a set of object boundaries with associated probabilities 1202 might be [0.72, 0, 0, . . . , 0.83] for ["Office Logo", "AMEX Logo", "Word Logo", . . . , "Padlock"]. Because screen shot_1001 contains images very similar to Office Logo and Padlock, the probabilities for those objects are relatively high (0.72 and 0.83). Because screen shot_1001 does not contain an AMEX Logo or Word Logo, the probabilities for those objects are 0.

During the training phase, an analyst will define object bounds 1203 of known bad visual cues in screenshot data, as shown graphically in FIG. 12. These annotated images are then augmented with slight changes (so as to not change the defined object bounds) to generate a very large corpus of known bad images with object bounds. Known good images are annotated by the analyst as having 0 object bounds. Next, each image is associated with a vector 1204 of metadata which has been extracted from the file and a model is trained. The results of the training phase are stored in visual reference dataset 904, which comprises visual elements across some or all of the input files, such as file 103.

After the training phase, malicious code detection module 502 is used in an implementation phase to detect potentially malicious files.

Figure 13:
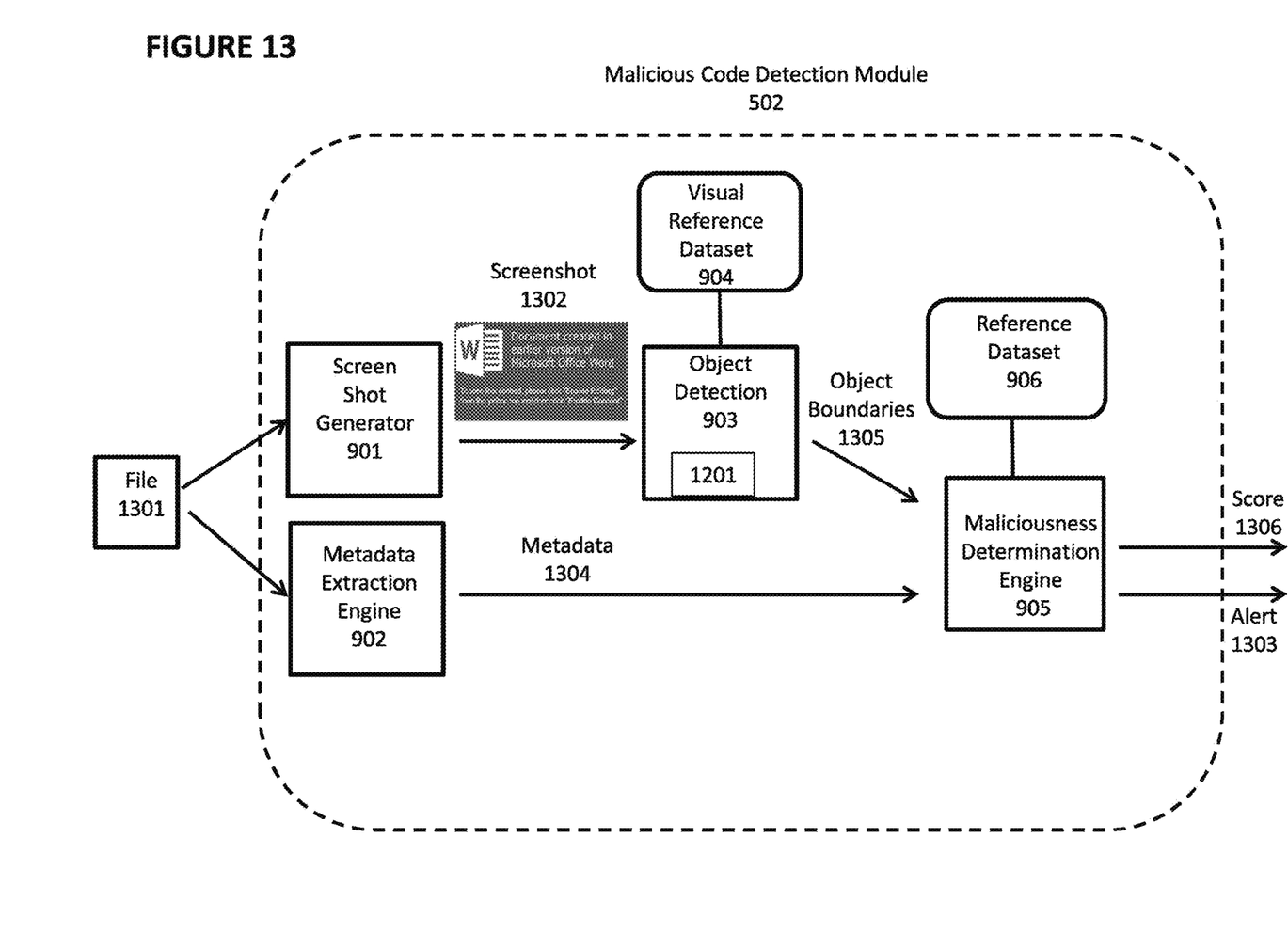
FIG. 13 depicts the malicious code detection module analyzing a received file and generating an alert.

In FIG. 13, a new file, file 1301, is received by malicious code detection module 502. Screen shot generator engine 901 receives file 1301 and generates screen shot 1302. File 1301 also is forwarded to metadata extraction engine 902, which extracts metadata 1304 from file 1301.

Screen shot 1302 is cropped, normalized, and forwarded to the object detection engine 903. Object detection engine 903 uses convolutional neural network 1201 to output a set of object boundaries 1305 for known bad visual cues. Both the object boundaries 1305 from object detection engine 903 and metadata 1304 from metadata extraction engine 902 are forwarded to the maliciousness determination engine 905 to make a prediction of maliciousness.

Maliciousness determination engine 905 determines whether or not to generate alert 1303 indicating that file 1301 is potentially malicious. This determination can be made by comparing the object boundaries 1305 for visual cues from object detection engine 903 and metadata 1304 from metadata extraction engine 902 to reference dataset 906 containing data for known malicious and benign artifacts in pre-determined thresholds. This configuration may be summarized as a model that outputs maliciousness score 1306 based on reference dataset 906.

Alert 1303 can be generated if maliciousness score 1306 exceeds one or more pre-determined thresholds. Optionally, an administrator can set the thresholds to cause the generation of alert 1303 to be more or less conservative.

Various actions can be taken in response to alert 1303. For example, file 1301 can be disabled or quarantined so that it cannot be opened in its native software application on server 102 or client device 101b. As another example, an email, SMS or MMS message, or other communication can be sent by server 102 or client device 101b to an administrator.

Optionally, as part of alert 1303 or in response to alert 1303, display 408 can display the visual elements in the screenshot 1001 that substantially contributed to the maliciousness score. That is, the visual elements that substantially increased the likelihood that file 103 contains malicious code are displayed and identified for the user, so that he or she can become educated about the visual elements being utilized by malicious actors. In the example of FIG. 12, an example of a visual element to be displayed and identified might be the "Office" logo which has been copied by a malicious actor in an attempt to trick users into believing the file is non-malicious. The visual element can be displayed in isolation, or it can be highlighted or emphasized in a manner such as that shown in FIG. 12 where visual elements are shown with graphical boundaries around them.

Compared to the prior art, malicious code detection module 502 provides numerous benefits including: decoupling the presentation of malicious documents from the malicious code embedded within or associated with the malicious documents; and removing reliance on underlying code and API parameters to allow new malware to be discovered solely via presentation of the document. The embodiments described herein can operate on any type of file, such as word processing documents, web pages from phishing websites, and spearphishing emails.

It is to be understood that the present invention is not limited to the embodiment(s) described above and illustrated herein, but encompasses any and all variations evident from the above description. For example, references to the present invention herein are not intended to limit the scope of any claim or claim term, but instead merely make reference to one or more features that may be eventually covered by one or more claims.

What is claimed is:

1. A method for analyzing a received file to determine if the received file comprises malicious code, the received file capable of being opened by a native software program, the method comprising:
 executing a print preview operation by a screen shot generating engine to generate a screen shot, the screen shot being an image that would be displayed if the received file is opened by the native software program and the screen shot generating engine being executed by a processor;
 analyzing the image and generating an output;
 extracting metadata from the received file; and
 generating, by a maliciousness determination engine executed by the processor, a maliciousness score based on a comparison of the output for visual cues and the metadata to a reference dataset, the reference dataset comprising screenshots of known benign files and known malicious files, each of the known malicious files being annotated with defined object boundaries that represent known bad visual cues.

2. The method of claim 1, further comprising:
 generating an alert, by the processor, if the maliciousness score exceeds a threshold.

3. The method of claim 1, wherein the analyzing step comprises utilizing a convolutional neural network with an object detection engine executed by the processor to generate the output.

4. The method of claim 1, wherein the threshold is set by an administrator.

5. The method of claim 1, wherein the received file is a word processing file.

6. The method of claim 1, wherein the received file is a web page.

7. The method of claim 1, wherein the received file is an email.

8. The method of claim 1, wherein the image is generated without malicious code being executed by the processor.

9. The method of claim 2, further comprising:
 in response to the alert, disabling the execution of the received file.

10. The method of claim 1, wherein the processor is associated with a server.

11. The method of claim 1, wherein the processor is associated with a client device.

12. The method of claim 1, further comprising:
 displaying, on a display device, visual elements in the screenshot that contributed to the maliciousness score.

13. The method of claim 2, further comprising:
 in response to the alert, quarantining the received file, such that the received file cannot be opened in its native software application on a server or a client device.

14. The method of claim 3, wherein the convolutional neural network generates a set of object boundaries with associated probabilities.

15. The method of claim 12, wherein the visual elements are displayed in isolation.

16. A non-transitory computer-readable storage medium having embodied thereon a program, the program executable by a processor to perform a method for analyzing a received file to determine if the received file comprises malicious code in a system comprising a processor, the method comprising:
 executing a print preview operation by a screen shot generating engine to generate a screen shot, the screen shot being an image that would be displayed if the received file is opened by the native software program and the screen shot generating engine being executed by a processor;

analyzing the image and generating an output;

extracting metadata from the received file; and generating a maliciousness score based on a comparison of the output for visual cues and the metadata to a reference dataset, the reference dataset comprising screenshots of known benign files and known malicious files, each of the known malicious files being annotated with defined object boundaries that represent known bad visual cues.

17. The non-transitory computer-readable storage medium of claim 16, wherein the processor is configured to execute instructions for performing the following additional step:

generating an alert if the maliciousness score exceeds a threshold.

18. The non-transitory computer-readable storage medium of claim 16, wherein the received file is a word processing file.

19. The non-transitory computer-readable storage medium of claim 16, wherein the received file is a web page.

20. The non-transitory computer-readable storage medium of claim 16, wherein the received file is an email.

* * * * *